United States Patent
Kobayashi et al.

[11] 3,941,106
[45] Mar. 2, 1976

[54] ARRANGEMENT FOR HEATING THE SUCTION GASES OF AN INTERNAL COMBUSTION ENGINE

[75] Inventors: Nobuyuki Kobayashi; Masahiko Nakada, both of Toyota, Japan

[73] Assignee: Toyota Jidosha Kogyo Kabushiki Kaisha, Japan

[22] Filed: Dec. 12, 1973

[21] Appl. No.: 424,085

[30] Foreign Application Priority Data
Aug. 25, 1973 Japan.............................. 48-94838

[52] U.S. Cl. ...................... 123/122 AC; 123/122 H
[51] Int. Cl.² ........................................ F02M 31/00
[58] Field of Search ..... 123/122 R, 122 H, 122 AC, 123/141

[56] References Cited
UNITED STATES PATENTS

| | | | |
|---|---|---|---|
| 2,196,330 | 4/1940 | Chandler | 123/122 H |
| 2,380,374 | 7/1945 | Anderson | 123/122 H |
| 2,434,192 | 1/1948 | Braun | 123/122 H |
| 2,437,724 | 3/1948 | Brown | 123/122 H |
| 2,503,071 | 4/1950 | Scherger | 123/122 H |
| 3,831,568 | 8/1974 | Heimburg | 123/141 |

FOREIGN PATENTS OR APPLICATIONS

| | | | |
|---|---|---|---|
| 753,938 | 4/1933 | France | 123/122 H |

Primary Examiner—Charles J. Myhre
Assistant Examiner—R. H. Lazarus
Attorney, Agent, or Firm—Kenyon & Kenyon

[57] ABSTRACT

An arrangement is disclosed for heating the suction gases of an internal combustion engine in order to promote the vaporization of the fuel contained within the suction gases while the engine is still in a cool state. In the arrangement, the high temperature exhaust gases of the engine are routed, by the control of a rotatable control valve in the exhaust manifold, around fins formed on the exterior wall of the bottom floor of the intake manifold for receiving the heat of the exhaust gases, and a covering is provided for enclosing the fins in a closed chamber which is defined between the covering and the exterior wall of the intake manifold. The covering is provided with inlet and outlet ports so as to introduce the exhaust gases into the chamber and drain the exhaust gases from the chamber. The covering is further provided with a vertical wall extending therefrom into the exhaust manifold so that the control valve comes in close contact with said wall when the control valve is rotated to a position where the exhaust gases are routed in said closed chamber. The exhaust gases introduced in the chamber heat the entire surfaces of the fins so that the heat of the exhaust gases is transmitted to the fuel within the suction gases thereby promoting vaporization of the fuel within the suction gases.

5 Claims, 7 Drawing Figures

ARRANGEMENT FOR HEATING THE SUCTION GASES OF AN INTERNAL COMBUSTION ENGINE

The present invention relates to an internal combustion engine with an arrangement for the heating of suction gases, in which the intake manifold is heated by the high temperature exhaust gases so that vaporization of the liquid fuel contained within the suction gases flowing in the intake manifold is promoted, and more particularly relates to an improved arrangement for heating the suction gases sucked into an internal combustion engine in order to promote vaporization of the liquid fuel within the suction gases before the engine warms up whereby harmful constituents remaining in the exhaust gases from the engine can be reduced and simultaneously, the power of the engine can be increased.

Generally, in the starting period of an internal combustion engine, and especially in the starting period of a completely cooled engine or of an engine in the cold season, not only the engine itself but also the suction system for the engine are cold. Therefore, the fuel cannot be completely vaporized, and as a result the engine is not supplied with an appropriate air fuel mixture. Also, such incomplete vaporization of the fuel causes unequal distribution of the air fuel mixture to each cylinder of the engine. Thus, in such engine, incomplete combustion or failure of combustion often takes place until the engine together with its suction system is warmed up and, accordingly, numerous harmful constituents remain in the exhaust gases from the engine.

In order to eliminate the foregoing drawbacks, it has already been proposed to heat the suction system of an engine so as to promote vaporization of the fuel within the suction gases, in the starting period or until the engine warms up. That is, two arrangements for heating the suction systems have been proposed. In the first arrangement, cooling water for the engine is routed adjacent to the intake manifold so that heat absorbed from the engine by the cooling water is employed for heating the intake manifold. In the second arrangement, the exhaust manifold is disposed adjacent to the intake manifold so that the exhaust gases having high temperature and flowing in the exhaust manifold are employed for heating the intake manifold thereby heating the fuel contained in the suction gases flowing in the intake manifold.

However, in the above-mentioned first arrangement, the highest temperature of the cooling water due to absorbing heat from the engine is never too far above 100° centigrade if the engine is working properly, and also, the temperature rises at a very slow rate. From these facts, the first arrangement employing the cooling water lacks ability to immediately attain the heating of the fuel in the intake manifold. Consequently, the second arrangement employing the exhaust gases which have extremely high temperature as soon as the engine starts, is conventionally used. However, in an internal combustion engine with a conventionally used arrangement for the heating of the suction gases, a shortcoming is encountered, which will be explained later with reference to FIGS. 1 and 2.

Therefore, an object of the present invention is to obviate the shortcoming of the conventionally used arrangement for heating the suction gases of an internal combustion engine.

Another object of the present invention is to improve the conventionally used arrangement for heating the suction gases of an internal combustion engine so that the high temperature exhaust gases exhausted from the engine are prevented from reaching the intake manifold after the engine has warmed up, in order to prevent the engine apparatus including the intake manifold from being overheated.

Other objects and advantages of the present invention will become apparent from the ensuing description and the accompanying drawings which illustrate both a conventional arrangement for the heating of the suction gases of an internal combustion engine, and, by way of examples, embodiments of the arrangement for the heating of the suction gases of an internal combustion engine of the present invention.

Figure 1:
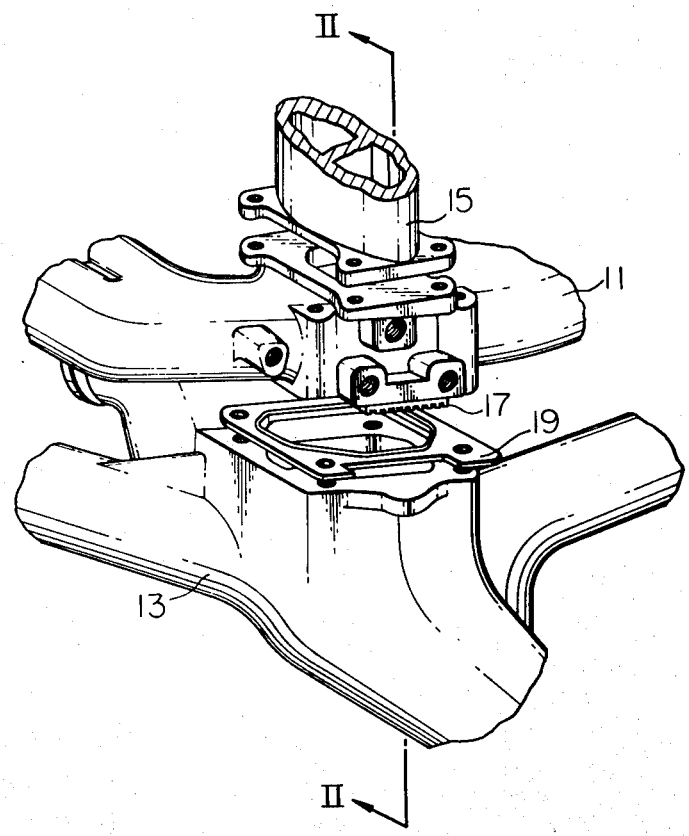
FIG. 1 is a perspective and disassembled view in part, of intake and exhaust manifolds of an internal combustion engine, in which manifolds, a known arrangement for heating the suction gases is provided.

In FIG. 1, numerals 11 and 13 represent intake and exhaust manifolds, respectively. The upper end of the intake manifold 11 is connectable with a carburetor 15 and the branching pipes of the intake manifold 11 are connectable with each cylinder of an internal combustion engine. The suction gases for the internal combustion engine are sucked in the intake manifold 11 from the carburetor 15. The branching pipes of the exhaust manifold 13 are also connectable with the internal combustion engine so that the exhaust gases exhausted from the engine are collected into the exhaust manifold 13. The collected exhaust gases can be routed, by the control of a later described valve, around heat receivable fins 17 which are formed on the exterior wall of the intake manifold 11. Thus, the exhaust gases having extremely high temperature heat the fins 17 and, as a result, the heat is transmitted to the suction gases in the intake manifold thereby promoting the vaporization of the fuel within the suction gases. The numeral 19 designates a sealing gasket disposed between the intake manifold 11 and the exhaust manifold 13.

Figure 2:
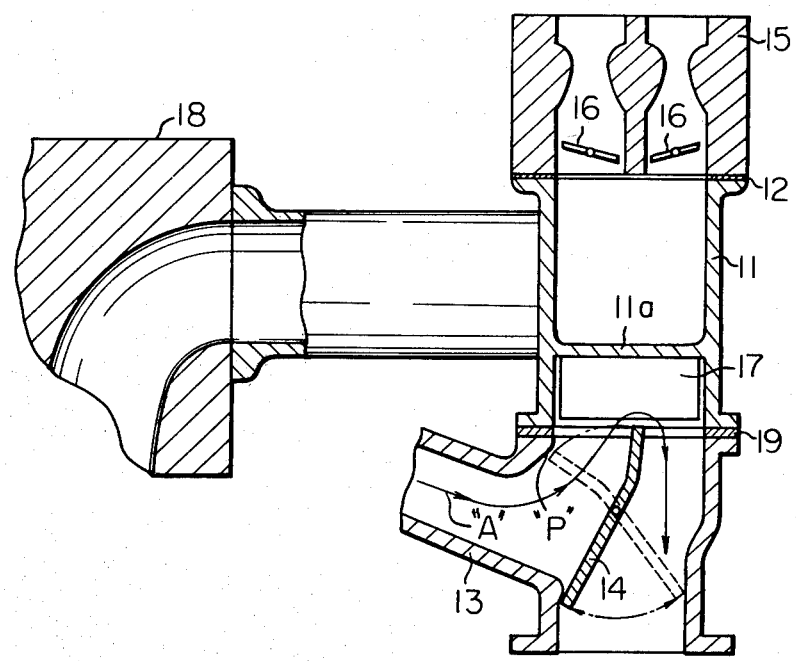
FIG. 2 is a cross sectional view taken along the line II—II of FIG. 1.

Referring to FIG. 2 which is a vertical cross sectional view taken along the line II—II of FIG. 1, a bottom floor part 11a of the intake manifold 11, which is disposed underneath the carburetor 15, is provided with a number of plate-shaped fins 17 formed on the exterior bottom wall of the floor 11a. The intake manifold 11 is connected with the carburetor 15 via a gasket 12 for sealing the connection between the intake manifold 11 and the carburetor 15. In this carburetor, well known throttle valves 16 are provided. The intake manifold 11 is connected to cylinder head 18 of the engine by way of the branching pipes, as described in the foregoing. To the lower flange of the bottom floor part 11a of the intake manifold 11, the exhaust manifold 13 is connected via sealing gasket 19. In the interior of the exhaust manifold 13, a plate-shaped control valve 14 for controlling the direction of flow of the exhaust gases is provided so that it can be rotated by a suitable exterior mechanism so as to take the two positions shown by the solid and dotted lines. That is, before the engine and the intake manifold 11 wamp up, the control valve 14 takes the position shown by the solid line and controls the flow of the exhaust gases coming from the engine so that the exhaust gases having high temperature are routed along the shown line "A" so as to contact the fins 17. As a result, the heat of the exhaust gases is transmitted to the fins 17, which are formed so as to have large surfaces to receive the heat and subsequently, the fuel flowing in the intake manifold 11 is heated by the heat transmitted to the fins 17 so that vaporization of the liquid fuel is promoted. When the engine and the intake manifold 11 warm up, the control valve 14 is rotated to the position shown by the dotted line so that it prevents the flow of the high temperature exhaust gases exhausted by the engine from reaching the heat receivable fins 17. As a result, the intake manifold can be prevented from overheating which decreases the density of the air within the intake manifold 11 and consequently, the amount of the air sucked in the intake manifold 11 decreases thereby causing a poor combustion in the engine.

However, in this arrangement of FIG. 2, even if the control valve 14 is kept in the position shown by the solid line, the exhaust gases tend to stream along the line shown by the arrow "A" in FIG. 2 so as to contact only the central part of the fins 17. That is to say, at the opposite ends of each fin 17, direct contact of the fin 17 and the exhaust gases becomes very poor and, therefore, heat transmission efficiency is very poor. Thus, the plate-shaped fins 17 provided for the purpose of receiving the heat cannot efficiently attain their purpose. Therefore, in the end, a considerable amount of time is required for warming up the engine apparatus including the suction system. Further, in the arrangement of FIG. 2, when the control valve 14 is rotated to the position shown by the dotted line after the warming up of the engine and the intake manifold 11, part of the exhaust gases pass through a gap "P", which is left between the interior wall of the exhaust manifold 13 and the valve 14 in order to mitigate difficulties in the mechanical design of the arrangement, and the exhaust gases passing the gap "P" reach the fins 17. Consequently, the intake manifold 11 is overheated through the fins 17 and as a result, the aforementioned decrease of the suction air takes place. Thus, the reduction of the power of the engine as well as damage and decrease of life of the intake manifold 11 are encountered.

In accordance with the present invention, an improvement is attained in a manner such that before the warming up of the engine apparatus including the suction system, the flow of the high temperature exhaust gases is controlled so that the exhaust gases are directed equally over the entire surface of each fin of the intake manifold whereby the heat of the exhaust gases is sufficiently transmitted to the fuel streaming in the intake manifold in order to promote vaporization of the fuel and to shorten the time required for warming up the engine and the suction system.

Also, a further improvement is attained in a manner such that, after the warming up of the engine apparatus including the suction system, the high temperature exhaust gases are positively prevented from reaching the fins in order to avoid the overheating of the engine apparatus.

The present invention will now be explained with reference to FIG. 3 through FIG. 7. It should be noted that the same parts or elements as those of the prior art of FIGS. 1 and 2 are designated by the same reference numerals and also, like elements are designated by like reference numerals.

Figure 3:
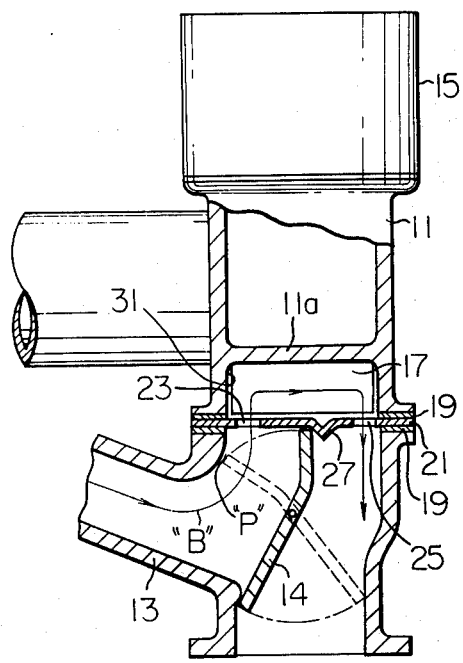
FIG. 3 is a similar cross sectional view to FIG. 2 with an embodiment of an arrangement for heating the suction gases of an internal combustion engine according to the present invention.

FIG. 3 is a cross sectional view of an embodiment of an arrangement for heating the suction gases according to the present invention.

Referring to FIG. 3, it will be understood that the outline of the basic arrangement for heating the suction gases according to the present invention is the same as the prior art arrangement of FIG. 2. That is, in the arrangement of FIG. 3, the bottom floor part 11a of the intake manifold 11 is provided with a number of plate-shaped fins 17 formed as one part with the floor part 11a, and an exhaust manifold 13 in which a control valve 14 is mounted so as to be rotated by an appropriate operating mechanism (not shown), is connected to the intake manifold 11 via sealing gaskets 19. It should be understood that the operating mechanism of the control valve 14 is actuated in response to a signal produced through detection of the temperature of e.g. the engine or the intake manifold, by which temperature it can be detected whether the engine apparatus warms up or not. However, in the arrangement of FIG. 4, a partition wall like horizontal covering 21 is arranged underneath the fins 17 in a manner such that a closed chamber 31 is defined between the covering 21 and the bottom floor 11a of the intake manifold 11, and the fins 17 are enclosed in the chamber 31. The covering 21 is provided with an inlet port 23 positioned at the upstream end with respect to the flowing direction of the exhaust gases. This inlet port 23 allows the high temperature exhaust gases to pass therethrough and to enter into the chamber 31 along the shown line "B" so as to contact the fins 17 in the chamber 31, when the control valve 14 is rotated to the position shown by the solid line in FIG. 3. In order to drain the exhaust gases from the chamber 31, the covering 21 is also provided with an outlet port 25 positioned at the downstream end with respect to the flowing direction of the exhaust gases. As described above, since the inlet port 23 and the outlet port 25 are disposed at the opposite ends of the covering 21 with respect to the general flowing direction of the exhaust gases, and at the bottom of the chamber 31, it should be appreciated that the high temperature exhaust gases coming from an engine via the branching pipes of the exhaust manifold 13 by-pass, by the control of the control valve 14, in the chamber 31, and the heat of the exhaust gases can be sufficiently transmitted to the entire surface of every fin 17 while the exhaust gases move in the chamber 31. The exhaust gases which have finished the transmission of the heat thereof to the fins 17, come out of the chamber 31 through the outlet port 25. It should be understood that when the control valve 14 is brought into a closed position, as shown in FIG. 3 by a solid line, the exhaust gases coming from an engine are prevented from directly proceeding in the exhaust pipe positioned downstream of the exhaust manifold 13. In the embodiment of FIG. 3, the covering 21 is also provided with a projection 27 formed on the surface thereof which faces the exhaust manifold 13. Therefore, when the control valve 14 is rotated so as to lead the flow of the exhaust gases into the chamber 31 before the warming up of the engine apparatus, the control valve 14 closely contacts the projection 27. As a result, no gap through which the exhaust gases directly pass into the exhaust pipe, is left between the surface of the covering 21 and the top end of the control valve 14, as is understood from FIG. 3. That is, leakage of the exhaust gases is completely prevented. Thus, it will be understood that when the control valve 14 contacts the projection 27, the high temperature gases are introduced with certainty into the chamber 31, so that the heat transmission efficiency to the intake manifold 11 is definitely heightened, and the time required for warming up the engine apparatus is shortened.

Figure 4:
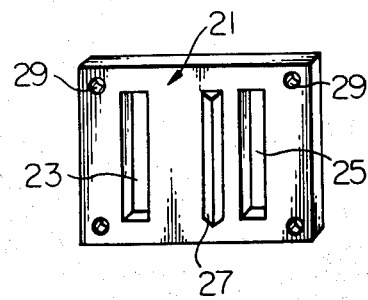
FIG. 4 is a perspective view of the fin covering used in the arrangement of FIG. 3.

Referring now to FIG. 4, which is a perspective view of the covering 21 disposed between the intake and exhaust manifolds 11 and 13 of FIG. 3, it will be understood that the covering 21 is provided with the inlet port 23, the outlet port 25, the projection 27 and mounting holes 29, through which screw bolts for mounting the covering 21 pass. In FIG. 3, when the engine apparatus including the suction system sufficiently warms up, the control valve 14 is rotated to an opened position shown by the dotted line as mentioned previously. Consequently, the high temperature exhaust gases are prevented from flowing into the chamber 31, and flow past the control valve 14 toward the exhaust pipe opening to the atmosphere. At this time, it should be noted that even if part of the exhaust gases introduce into the back of the control valve 14 through the shown gap "P", the covering 21 can prevent their flowing into the chamber 31 and, as a result, the overheating of the intake manifold 11 can be avoided.

Figure 5:
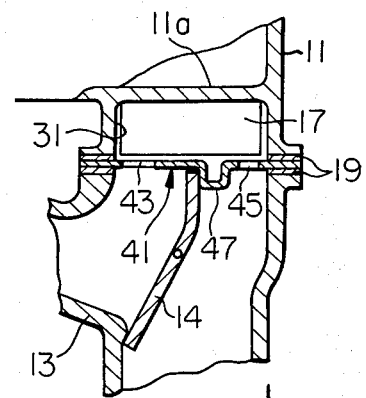
FIGS. 5 through 7 are similar and partial cross sectional views taken on the same sectional line as FIG. 3, with respect to the other embodiments of the arrangements according to the present invention.

FIG. 5 shows another embodiment of the present invention. In this embodiment, the numeral 41 designates a covering modified from the covering 21 of FIGS. 3 and 4. That is, the covering 41 is provided with a vertical projection 47 together with an exhaust gas inlet port 43 and an exhaust gas outlet port 45. It should be appreciated that the vertical projection 47 has an enlarged surface for contacting the valve 14, as compared to the projection 27 of the covering 21. As a result, the close contact of the valve 14 and the projection 47 can provide a more perfect prevention of leakage of the high temperature exhaust gases before the warming up of the engine apparatus.

Figure 6:
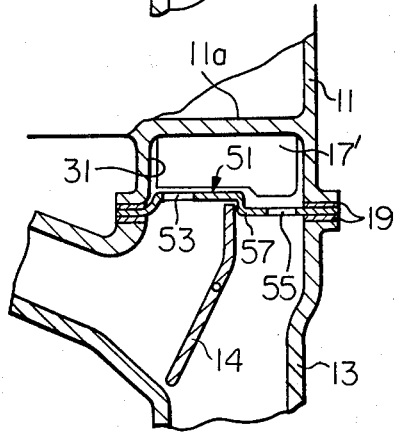

FIG. 6 shows a further embodiment of the present invention. In this embodiment, a covering 51 is provided with a step portion 57 together with inlet and outlet ports 53 and 55. From FIG. 6, it will be seen that the step portion 57 can contact the valve 14 so as to act as a sealing wall for the exhaust gases. Further, it should be noted that in this embodiment, the shape of each fin 17' is slightly modified from that of each fin 17 so as to fit the stepped shape of the covering 51. That is, the surface area of each fin 17' is increased above that of the fins 17 so as to increase the heat transmission efficiency.

Figure 7:
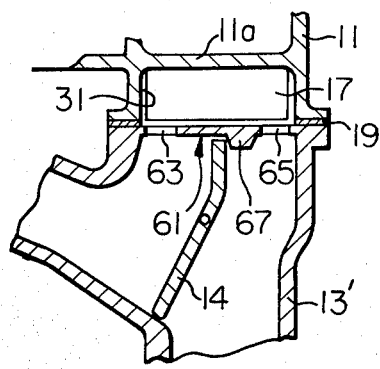

FIG. 7 shows a still further embodiment of the present invention. In this embodiment, a covering 61 for enclosing fins 17 is formed as one part with an exhaust manifold 13'. The covering 61 is provided with inlet and outlet ports 63 and 65 for the exhaust gases along with a thick projection 67 extending vertically in the exhaust manifold 13'. This thick projection 67 can provide rigid physical strength compared with the previous projections 27, 47 and 57. In the shown embodiments, each sealing gasket 19 is formed as a separate element. However, it is of course possible to form the gasket 19 as one part with each covering 21 in order to effect the easy assembling of the covering 21 when each arrangement according to each embodiment is constructed. Of course, it is also possible to form the covering as one part with the intake manifold 11 while forming a projection or a wall extending vertically in the exhaust manifold.

From the foregoing, it will be understood that according to the present invention, diverse advantages such as reduction of the harmful constituents in the exhaust gases, increase of the power of an internal combustion engine, and a guarantee of long life of an intake manifold are obtained. Further, it should be noted that the arrangement of the present invention can be provided without any large increase in the production cost, since many of the same elements as the conventionally used arrangement for heating the suction gases of an internal combustion engine, are employed.

What is claimed is:

1. A heater for incoming fuel-air mixture to an internal combustion engine of the type that includes an intake manifold for said mixture having a bottom floor area; a plurality of heat conducting fins extending downward from the exterior wall of the intake manifold in the bottom floor area; an exhaust manifold disposed underneath the intake manifold adjacent to the finned area for conveying hot combustion products from the engine; a circumscribing wall surrounding the finned area and having a flanged lower face for mating engagement with a flanged opening through the wall of the exhaust manifold underneath the finned area; a partition clamped between the flanged faces of the circumscribing wall and the opening in the wall of the exhaust manifold for enclosing the fins in a chamber defined by the partition, the circumscribing wall, and the exterior wall of the intake manifold, the partition having an inlet port adjacent to one side of the circumscribing wall for introducing the combustion products into the chamber and an outlet port spaced from the inlet port adjacent to the opposite side of the circumscribing wall for exhausting the combustion products from the chamber; a projecting wall extending downward from the flanged opening into the exhaust manifold; and a butterfly type control valve mounted in the exhaust manifold in the way of the opening for rotation about a horizontal axis parallel to the wall between a first position and a second position, the valve when in the first position deflecting the flow of hot combustion gases through the inlet port to contact the fins for heating the intake gases and for returning the combustion products to the exhaust manifold through the outlet port, the valve when in the second position substantially blocking the opening through the wall of the exhaust manifold to prevent the combustion gases from contacting the fins, and the valve coming into close contact with the projecting wall when the valve is in one of said first and second positions for preventing leakage of the combustion products around the valve when the valve is in said position, wherein the improvement comprises:

said partition being a thin plate and the projecting wall being formed integrally with the partition on a central portion of the under surface of said plate.

2. The heater of claim 1 wherein said projecting wall comprises a stepped portion of the plate between the inlet port and the outlet port.

3. The heater of claim 2 wherein the portion of the thin plate surrounding the inlet port is offset vertically from the portion of the plate surrounding the outlet port to form said stepped portion between the inlet port and the outlet port.

4. The heater of claim 1 wherein the projecting wall comprises an offset portion of the material of the thin plate between the inlet port and the outlet port, said offset portion having a triangular cross section.

5. The heater of claim 1 wherein the projecting wall comprises an offset portion of the material of the thin plate between the inlet port and the outlet port, said offset portion having a rectangular cross section.

* * * * *